(12) United States Patent
Vasekin et al.

(10) Patent No.: US 7,529,889 B2
(45) Date of Patent: May 5, 2009

(54) DATA PROCESSING APPARATUS AND METHOD FOR PERFORMING A CACHE LOOKUP IN AN ENERGY EFFICIENT MANNER

(75) Inventors: Vladimir Vasekin, Waterbeach (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 276 days.

(21) Appl. No.: 11/503,410

(22) Filed: Aug. 14, 2006

(65) Prior Publication Data

US 2008/0040546 A1   Feb. 14, 2008

(51) Int. Cl.
*G06F 12/08* (2006.01)
(52) U.S. Cl. .................. 711/128; 711/118; 711/119; 711/120; 711/123; 711/125; 711/126; 711/130
(58) Field of Classification Search .......... 711/118–120, 711/123, 125, 126, 128, 130
See application file for complete search history.

(56) References Cited

U.S. PATENT DOCUMENTS 6,983,346 B2 * 1/2006 Zhang ..................... 711/138
2006/0143390 A1 * 6/2006 Kottapalli .................. 711/130

* cited by examiner

*Primary Examiner*—Jasmine Song
(74) *Attorney, Agent, or Firm*—Nixon & Vanderhye P.C.

(57) ABSTRACT

A data processing apparatus and method are provided for performing a cache lookup in an energy efficient manner. The data processing apparatus has at least one processing unit for performing operations and a cache having a plurality of cache lines for storing data values for access by that at least one processing unit when performing those operations. The at least one processing unit provides a plurality of sources from which access requests are issued to the cache, and each access request, in addition to specifying an address, further includes a source identifier indicating the source of the access request. A storage element is provided for storing for each source an indication as to whether the last access request from that source resulted in a hit in the cache, and cache line identification logic determines, for each access request, whether that access request is seeking to access the same cache line as the last access request issued by that source. The cache control logic is operable when handling an access request to constrain the lookup procedure to only a subset of the storage blocks within the cache if it is determined that the access request is to the same cache line as the last access request issued by the relevant source, and the storage element indicates that the last access request from that source resulted in a hit in the cache. This yields significant energy savings when accessing the cache.

17 Claims, 7 Drawing Sheets

DATA PROCESSING APPARATUS AND METHOD FOR PERFORMING A CACHE LOOKUP IN AN ENERGY EFFICIENT MANNER

BACKGROUND OF THE INVENTION

1. Field of the Invention

The present invention relates to a data processing apparatus and method for performing a cache lookup in an energy efficient manner.

2. Description of the Prior Art

When a processing unit of a data processing apparatus, for example a processor core, is performing operations, it typically requires access to multiple data values when performing those operations. These data values may be instructions defining the type of operations to be performed, or the actual data manipulated by those operations. In the following description, both instructions and data will be referred to as data values.

Accessing data values in memory can significantly impact the performance of the data processing apparatus, since the number of clock cycles taken to access memory is relatively large when compared with the processing speed of the processing unit. Accordingly, it is known to provide one or more caches for providing temporary storage of data values for access by the processing unit when performing operations. A cache resides between the processing unit and the memory and can store a subset of the data values in memory to allow quick access to those data values by the data processing unit.

Whilst in some systems only a single cache may be provided, it is known in other systems to provide a plurality of levels of cache. Accordingly, by way of example, a processing unit such as a processor core may have a level one cache associated therewith which may be a unified cache for storing both instructions and data, or may consist of a separate instruction cache and a separate data cache. These caches are typically relatively small, but provide fast access by the processing unit to the data values held therein. If a data value required is not in the level one cache, then a lookup can be performed in another cache provided at a different cache level. Hence, for example, a unified level two cache can be provided, which will typically be larger than the level one cache and hence able to store more data values than the level one cache. Such a level two cache may be provided specifically in association with a particular processing unit, or alternatively may be shared between multiple processing units.

If a required data value is not present in either the level one cache or the level two cache, then that data value will be retrieved from memory, unless some further levels of cache are provided, in which case those further levels of cache will be accessed first to determine if the data value is present in those caches, and only if it is not will the access then be performed in memory.

A cache will typically include a data Random Access Memory (RAM) having a plurality of cache lines each of which will typically store multiple data values, and the cache will typically further include a tag RAM for storing a tag value in association with each of the cache lines. When a processing unit wishes to access a data value, it will issue an access request specifying an address, that address including a tag portion which is compared with a selected tag value in the tag RAM. A match between that tag portion and the selected tag value indicates a hit condition, i.e. indicates that the data value the subject of the memory access request is in the cache. Thereafter, in the event of a hit condition, the required data value can be accessed in the data RAM.

The data RAM can be arranged as a plurality of storage blocks. For example, a common type of cache is an n-way set associative cache, and the data RAM of such a cache will typically have a storage block associated with each way of the cache. For speed reasons, it is often the case that the tag RAM and data RAM are accessed at the same time, such that whilst it is being determined whether the tag portion of an address matches a selected tag value within the tag RAM, the data values from a selected cache line can be accessed in preparation for a cache hit determination, such that if a cache hit condition is detected, the data values can then readily be accessed without further delay. Whilst such an approach enables high speed access, it increases the power consumption of the cache, since each separate storage block needs to be accessed. Indeed, it should be noted that the tag RAM may also include multiple storage blocks, and hence for example may include a separate storage block for each way. Accordingly, considering the example of a four way set associative cache, it will be appreciated that a cache lookup procedure as described above will involve accessing at least one tag storage block and four data storage blocks (and possibly up to four tag storage blocks and four data storage blocks if a tag storage block is provided per way).

One known way to seek to reduce the power consumption of the cache is to seek to detect sequential accesses directed to the same cache line and upon detecting such sequential accesses to reduce the number of storage blocks activated in the cache to service the cache lookup. By spotting that an access is sequential to, and in the same line as, a previous access, it is then possible to avoid doing a fill lookup in the cache, and in the best case it may merely be necessary to activate a single data RAM storage block, thereby significantly decreasing power consumption for such accesses.

It has been found that such an approach works particularly well with instruction caches where there is a high proportion of sequential accesses.

However, there are a number of situations which can reduce the benefits achievable by such a scheme by removing the sequentiality of accesses as observed by the cache. As an example, a processing unit may be arranged to execute a plurality of execution threads, and each execution thread will form a separate source of access requests to the cache. Typically, the processing unit may alternate between executing each execution thread, and as a result even if each independent thread is issuing access requests that are sequential, they will not be observed as such by the cache, which will typically handle an access request from one thread, followed by an access request from another thread. As a result, in such circumstances, the benefits achievable by the earlier described approach are significantly reduced.

Another example where the same issue arises is if the cache being accessed is a unified cache for storing instructions and data, and the processing unit is alternating between instruction access requests and data access requests (which may be from the same thread or a different thread). As another example, the cache may be a system level cache which is accessible by multiple processing units, and the access requests issued by one processing unit may be interleaved with access requests issued by a different processing unit. In such situations, even if one processing unit is issuing sequential access requests, they will not be observed as such by the system level cache.

Accordingly, it would be desirable to provide an energy efficient technique for accessing a cache in situations where a data processing apparatus having at least one processing unit provides a plurality of sources from which access requests are issued to the cache.

SUMMARY OF THE INVENTION

Viewed from a first aspect, the present invention provides a data processing apparatus comprising: at least one processing unit for performing operations; a cache having a plurality of cache lines for storing data values for access by the at least one processing unit when performing said operations; the at least one processing unit providing a plurality of sources from which access requests are issued to the cache, each access request specifying an address of a data value the subject of that access request, and each access request further including a source identifier indicating which of said plurality of sources issued that access request; cache control logic responsive to each access request to cause a lookup procedure to be performed in said cache, a hit condition occurring if the lookup procedure identifies that the data value the subject of the access request is in the cache; a storage element for storing, for each source, an indication as to whether the last access request from that source resulted in said hit condition; cache line identification logic operable, for each access request, to determine whether that access request is seeking to access a same cache line as the last access request issued by that source; said cache comprising a plurality of storage blocks in which said lookup procedure can be performed; said cache control logic being operable, for each access request, to identify from the source identifier the source of the access request; said cache control logic being further operable, if the cache line identification logic determines that the access request is to the same cache line as the last access request issued by that source, and the storage element indicates that the last access request from that source resulted in said hit condition, to constrain said lookup procedure to only a subset of said storage blocks.

In accordance with the present invention, a data processing apparatus has at least one processing unit providing a plurality of sources from which access requests are issued to the cache, and each access request includes a source identifier indicating which of the plurality of sources issued that access request. Further, a storage element is provided which stores, for each source, an indication as to whether the last access request from that source resulted in a hit condition in the cache. In addition, cache line identification logic determines, for each access request, whether that access request is to the same cache line as the previous access request issued by the same source. Cache control logic is arranged such that if it is determined that an access request from a particular source is to a same cache line as the last access request issued by that source, and the storage element indicates that the last access request from that source resulted in a hit condition, it then constrains the lookup procedure to only a subset of the storage blocks within the cache. By including source identifier information within each access request, and then keeping a record for each source as to whether the last access request from that source resulted in a hit condition, it is possible for the cache control logic to detect the presence of multiple accesses by a particular source to a particular cache line, even if those accesses are separated in time by accesses from different sources, thereby enabling in such situations the lookup procedure to be constrained to only a subset of the storage blocks, and hence enabling a reduction in power consumption when performing cache accesses.

The at least one processing unit may take a variety of forms, and hence for example may be a processor core, for example a CPU, a Direct Memory Access (DMA) engine, etc. In embodiments where multiple processing units are provided, then the processing units need not necessarily be of the same type, and accordingly may include a number of processor cores, a number of DMA engines, etc.

The cache may be arranged in a variety of ways. However, in one embodiment the cache comprises a plurality of cache ways, and said plurality of storage blocks comprise a plurality of way blocks for storing data values, each way block being associated with one of said cache ways. In one embodiment, each cache line stores one or more data values for each cache way. If the data values are sequentially accessed then each sequential access will be directed to a different way.

The manner in which the lookup procedure is constrained by the cache control logic can take a variety of forms. However, in one embodiment, the address specified by each access request identifies one of said cache ways, and for each access request, if the cache line identification logic determines that that access request is to the same cache line as the last access request issued by the identified source, and the storage element indicates that the last access request from that source resulted in said hit condition, the cache control logic is operable to prevent the lookup procedure being performed in any way block not associated with the cache way identified by the address. Accordingly, in such embodiments, in situations where an access request is directed to the same cache line as the last access request issued by the same source, and that last access request resulted in a hit in the cache, the cache control logic can be arranged to cause only a single way block to be subjected to the lookup procedure, thereby significantly reducing power consumption associated with handling that access request within the cache.

In one embodiment, if the storage element indicates that the last access request from that source resulted in said hit condition, the cache is operable to select as its output from the plurality of way blocks an output from the way block associated with the cache way identified by the address. Hence, in such instances, the identification of the hit condition within the storage element for the relevant source can be used to drive the selection of the output from the way blocks of the cache.

In one embodiment, the plurality of storage blocks further comprises a tag block for storing tag values, each tag value being associated with one of said cache lines, the address specified by each access request having a tag portion, and a match between that tag portion and a selected tag value in the tag block indicating said hit condition. For each access request, if the cache line identification logic determines that that access request is to a same cache line as the last access request issued by the identified source, the cache control logic is operable to prevent the lookup procedure being performed in the tag block. Accordingly, in such embodiments, irrespective of whether it is possible to avoid any lookups being performed in any of the way blocks, it is possible in such circumstances to avoid the need for a lookup in the tag block, thereby reducing power consumption.

In one embodiment, if for an access request the cache control logic causes the lookup procedure to be performed in the tag block, and said hit condition is detected, the indication provided in the storage element for the source issuing that access request is updated to identify said hit condition. In one particular embodiment, the indication provided in the storage element for the source issuing that access request is only updated to identify said hit condition if additionally the last access request from that source was to a different cache line to the cache line for which the hit condition has been detected. This hence reduces the number of times the storage element is updated resultant on hit conditions being detected on performing tag block lookups.

The cache line identification logic can be provided in a variety of ways. In one embodiment, the cache line identification logic identification logic is associated with each source, and each access request further includes a control value identifying if that access request is to the same cache line as the last access request issued by the source indicated by the source identifier. Hence, in such embodiments, the determination as to whether an access request is to the same cache line as the last access request issued by the source is made prior to issuing the access request, and the access request then identifies the result of that determination by inclusion of an appropriate control value within the access request. This simplifies the operation that needs to be performed by the cache control logic, since it is not required to make such a determination. One example of where such an embodiment may be used is in situations where the cache is a cache dedicated to a particular processing unit, for example a level one cache.

In an alternative embodiment, the cache line identification logic may be associated with the cache control logic and is operable to retain at least a portion of the address of the last access request from each source, on receipt of an access request the cache line identification logic being operable to compare the corresponding at least a portion of the address specified by that access request with the retained at least a portion of the address of the last access request from that source in order to determine whether the access request is seeking to access the same cache line. Hence, in this embodiment, the detection of the same cache line being accessed is made at the time the cache control logic processes the access request, and requires the retention of at least a portion of the address of the last access request from each source so that the necessary comparisons can be made with the address of the current access request in order to determine whether the access request is seeking to access the same cache line. An example of where such an embodiment may be used is in association with a system level cache that is accessible by multiple processing units, and in particular such an embodiment may be used where the bus protocol used to couple the various processing units with the system level cache does not support the transmission of a control value from each of the processing units identifying whether the access request is to the same cache line.

In one embodiment, the cache line identification logic comprises prediction logic operable for each access request to predict whether that access request is seeking to access the same cache line as the last access request issued by that source. Any of a number of known prediction schemes can be used for this purpose.

The at least one processing unit may provide the plurality of sources in a variety of ways. In one embodiment, the at least one processing unit is a processing unit having a plurality of execution threads, each execution thread forming one of said sources, and the cache is an instruction cache for storing instructions for access by the plurality of execution threads. Each independent execution thread is likely to spend much of its time executing a sequence of instructions existing at sequential addresses, and accordingly there are likely to be a significant number of access requests issued pertaining to the same cache line as the preceding access request. However, the instructions being executed by one thread may have no correspondence with the instructions executed by a different thread. However, given that each access request includes a source identifier indicating which of the plurality of sources issued that access request, then the cache control logic can readily identify which sources particular access requests have been issued by and apply the above described techniques in order to significantly reduce the power consumption required to process the various access requests issued by each of the execution threads.

In one embodiment, the at least one processing unit is a processing unit having at least one execution thread, and the cache is a unified cache for storing instructions and data, the at least one execution thread providing a first source for instruction access requests and a second source for data access requests. Hence, even in embodiments where there are not necessarily multiple execution threads, the technique of the present invention can be used to achieve significant power savings, by distinguishing between instruction access requests and data access requests, and looking for access requests to the same cache line from the same source, i.e. either the source of instruction access requests or the source of data access requests.

In one embodiment, the at least one processing unit comprises a plurality of processing units, each processing unit providing at least one of said sources, and the cache is a system level cache accessible by each of said processing units. Hence, in such embodiments, irrespective of whether multiple execution threads are used within any particular processing unit, each of the individual processing units provide separate sources, and the cache control logic associated with the system level cache can again use the earlier described techniques to achieve significant power savings in situations where an access request from a particular source is seeking to make an access to the same cache line as the last access request from that source and where the last access request from that source resulted in a hit within the cache.

In one such embodiment, the cache is a unified cache storing both instructions and data, at least one of said processing units providing a first source for instruction access requests and a second source for data access requests.

Viewed from a second aspect, the present invention provides a cache for use in a data processing apparatus having at least one processing unit for performing operations, the at least one processing unit providing a plurality of sources from which access requests are issued to the cache, each access request specifying an address of a data value the subject of that access request, and each access request further including a source identifier indicating which of said plurality of sources issued that access request, the cache comprising: a plurality of cache lines for storing data values for access by the at least one processing unit when performing said operations; cache control logic responsive to each access request to cause a lookup procedure to be performed in said cache, a hit condition occurring if the lookup procedure identifies that the data value the subject of the access request is in the cache; a storage element for storing, for each source, an indication as to whether the last access request from that source resulted in said hit condition; and a plurality of storage blocks in which said lookup procedure can be performed, said plurality of cache lines being provided within said plurality of storage blocks; the data processing apparatus further comprising cache line identification logic operable, for each access request, to determine whether that access request is seeking to access a same cache line as the last access request issued by that source; said cache control logic being operable, for each access request, to identify from the source identifier the source of the access request; said cache control logic being further operable, if the cache line identification logic determines that the access request is to the same cache line as the last access request issued by that source, and the storage element indicates that the last access request from that source resulted in said hit condition, to constrain said lookup procedure to only a subset of said storage blocks.

Viewed from a third aspect, the present invention provides a method of operating a data processing apparatus comprising at least one processing unit for performing operations, and a cache having a plurality of cache lines for storing data values for access by the at least one processing unit when performing said operations, the at least one processing unit providing a plurality of sources from which access requests are issued to the cache, and the method comprising the steps of: within each access request, specifying an address of a data value the subject of that access request, and a source identifier indicating which of said plurality of sources issued that access request; responsive to each access request, causing a lookup procedure to be performed in said cache, said cache comprising a plurality of storage blocks in which said lookup procedure can be performed, a hit condition occurring if the lookup procedure identifies that the data value the subject of the access request is in the cache; storing, for each source, an indication as to whether the last access request from that source resulted in said hit condition; for each access request: determining whether that access request is seeking to access a same cache line as the last access request issued by that source; identifying from the source identifier the source of the access request; and if that access request is to the same cache line as the last access request issued by that source, and the last access request from that source resulted in said hit condition, constraining said lookup procedure to only a subset of said storage blocks.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
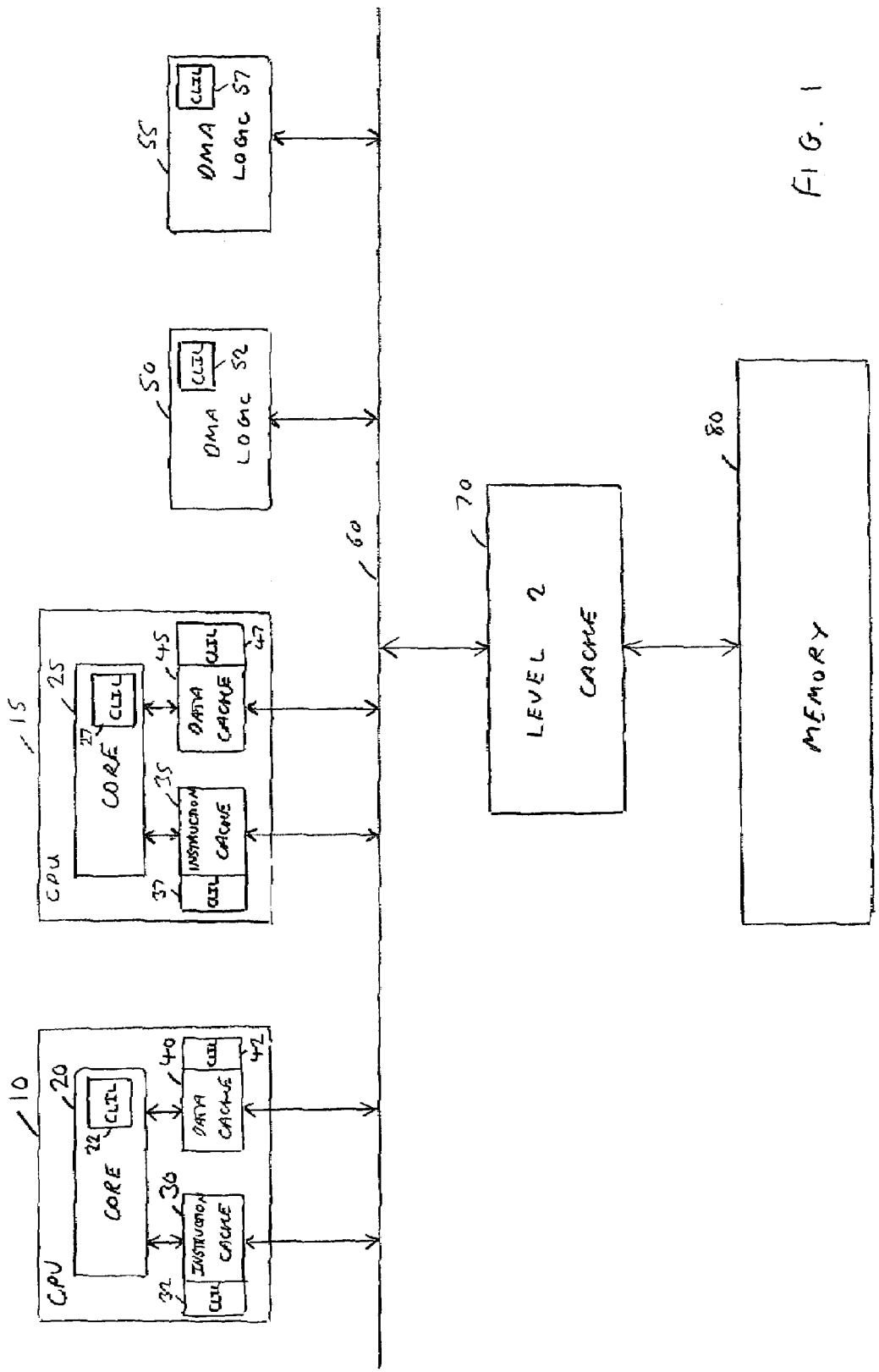
FIG. 1 is a block diagram of a data processing system in which embodiments of the present invention may be employed.

FIG. 1 is a block diagram of a data processing system in which embodiments of the present invention may be performed. As shown in FIG. 1, this exemplary data processing system includes two central processing units (CPUs) 10 and 15, each of which includes a processor core 20, 25 for performing data processing operations, an instruction cache 30, 35 for storing instructions for execution by the associated processor core 20, 25, and a data cache 40, 45 for storing data for access by the associated processor core 20, 25 when executing those instructions. These CPUs 10, 15 are connected to a system bus 60, to which are also connected two DMA logic blocks 50, 55. Whilst the CPUs 10, 15 may be used to perform a variety of data processing tasks, the DMA logic blocks 50, 55 are typically used for block data transfer processes. As an example of use of the DMA logic blocks 50, 55, such DMA logic blocks may be used to transfer blocks of data to and from the memory 80 via the level two cache 70.

Each core 20, 25 will typically include prefetch logic for prefetching instructions for execution by one or more processing pipelines within the processor core 20, 25. Accordingly, the prefetch logic will issue prefetch requests to the instruction cache 30 and in the event of a hit in the instruction cache this will result in instructions being returned from the instruction cache 30, 35 to the processor core 20, 25. In the event of a miss within the instruction cache 30, 35, then a fetch request will be output from the instruction cache 30, 35 to the level two cache 70. This will either result directly in a hit in the level two cache, or cause a linefill request to be issued from the level two cache to the memory 80 to cause a level two cache line's worth of data values to be retrieved from memory for storing in the level two cache 70, after which the required instruction can be returned to the instruction cache 30. Indeed, typically the level two cache 70 will respond by providing an instruction cache line's worth of instruction data values to the instruction cache 30, 35 for storing in a cache line of the instruction cache. Typically, the size of each cache line in the instruction cache 30, 35 (and also in the data cache 40, 45) is less than the size of each cache line in the level two cache 70, and accordingly only a portion of the content of a particular cache line in the level two cache 70 is required to provide a cache line's worth of data for the instruction cache 30, 35.

When executing instructions within the processor core 20, 25, load or store instructions will be executed in order to load data into working registers of the processor core 20, 25 or to store data from those registers to memory. In either event, this will result in the issuance of an access request to the associated data cache 40, 45. In the event that the data value the subject of the access request is in the data cache 40, 45, then the data value will be accessed directly from the data cache. However, in the event that the data value is not in the data cache, then a cache miss indication from the data cache will cause a data cache line's worth of data (including the data value the subject of the access request) to be retrieved from the level two cache 70. This will be provided directly from the level two cache 70 in the event of a cache hit in the level two cache, and in the event of a cache miss a level two cache line's worth of data will be retrieved from memory 80 in order to enable the required data values to be returned to the data cache 40, 45 via the level two cache 70.

As also shown in FIG. 1, in accordance with an embodiment of the present invention, cache line identification logic 22, 27, 32, 42, 37, 47, 52, 57 is provided in association with the sources of access requests in order to identify whether an access request is seeking to identify a same cache line as that accessed by the last access request from the same source, with a control value being added to the access request to identify this.

Hence, considering the cores 20, 25 and DMA logic units 50, 55, the associated cache line identification logic 22, 27, 52, 57, respectively will, for each access request, identify the source of that access request (whilst for some devices there may only be a single source, for other devices, such as those that have a plurality of execution threads, there will be multiple possible sources), and will then include with the access request a control value identifying whether that access request is to the same cache line as the previous access request from that source.

Considering the CPUs 10, 15, if a cache miss occurs within the instruction caches 30, 35 or data caches 40, 45 then the access request will need to be propagated on to the level 2 system cache 70. Since the cache lines in the level 2 system cache will typically be larger than in the level 1 caches 30, 35, 40, 45, then the determination as to whether the access request is to the same cache line as the previous access request from that source will need to be re-performed, in one embodiment this being performed by the cache line identification logic 32, 42, 37, 47 associated with the relevant level 1 cache in which the cache miss occurred.

Figure 2:
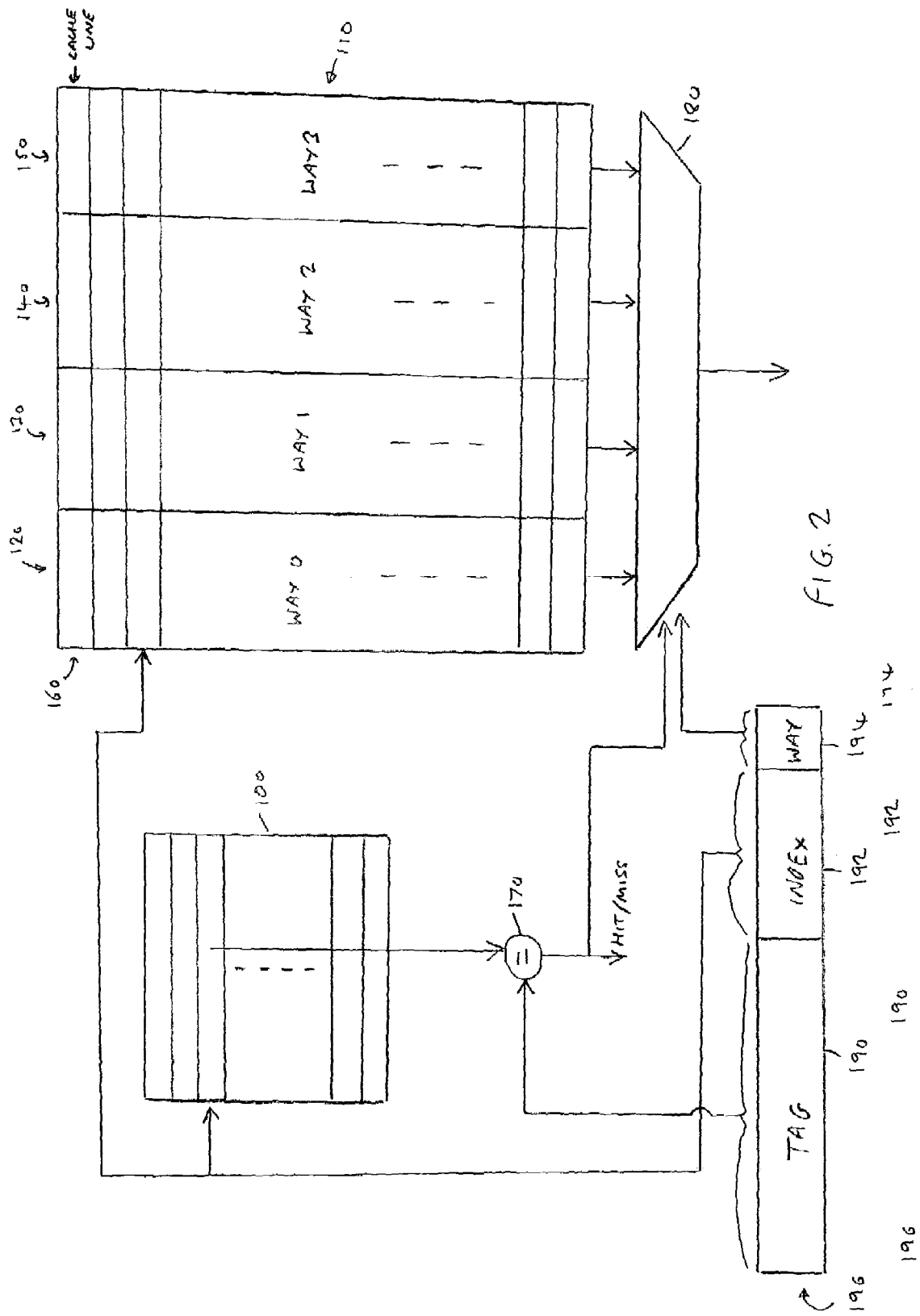
FIG. 2 is a diagram schematically illustrating the operation of an n-way set asssociative cache.

FIG. 2 is a diagram schematically illustrating the structure of an n-way set associative cache, which may be used to form either the instruction caches 30, 35, the data caches 40, 45, or the level two cache 70. As shown in FIG. 2, the cache consists of a tag RAM 100 and a data RAM 110. In actual fact, the data RAM 110 consists of a separate data RAM block 120, 130, 140, 150 for each way of the n-way set associative cache, in this example it being assumed that the cache is a four way set associative cache. The data RAM 110 consists of a plurality of cache lines, each cache line typically storing a plurality of data values, for example data words. As shown in FIG. 2, in this example each cache line 160 stores one or more data values for each of the ways of the cache, and accordingly cache line 160 has one or more data values stored in the data RAM 120, one or more data values stored in the data RAM 130, one or more data values stored in the data RAM 140 and one or more data values stored in the data RAM 150. In one particular embodiment, each cache line consists of at least one data value stored in each way of the cache.

For each cache line, the tag RAM 100 has a corresponding entry, that entry storing a tag value along with certain other control bits. In particular, a valid bit may be included to identify whether the data values in the corresponding cache line are still valid, and a dirty bit may be provided to identify whether any of the data values in the corresponding cache line have been updated without that update being at the same time stored back to memory.

When a memory access request is issued by a master device, that memory access request will identify an address 196 associated with the data value the subject of the memory access request, along with certain other control information, for example whether the data value is cacheable, bufferable, etc. Each address 196 associated with a memory access request can be considered to comprise a tag portion 190, an index portion 192 and a way portion 194. The index portion 192 identifies a particular set within the set associative cache, a set comprising of a cache line extending through each of the ways.

The lookup procedure performed by the cache upon receipt of a memory access request will typically involve the index part 192 of the address being used to identify an entry in the tag RAM 100 associated with the relevant set, with the tag value in that entry being output to comparator logic 170 which compares that tag value with the tag portion 190 of the address. If the comparator detects a match between the tag portion of the address and the tag value accessed using the index portion, and assuming the valid bit indicates that the corresponding cache line is valid, then a hit signal is generated to identify a hit within the cache.

As also shown in FIG. 2, the index portion 192 is used to access the relevant cache line, and to cause the data value stored in each way of that cache line to be output to the multiplexer 180. In the event of a hit signal being generated by the comparator logic 170, then the way portion 194 of the address 196 is used to determine which of the inputs to the multiplexer 180 are output in association with the hit signal.

As mentioned earlier, in the event of a cache miss indicating that the data value the subject of the memory access request is not currently stored within the cache, then the cache will be arranged to issue a linefill request to cause a cache line's worth of data to be retrieved into the cache from memory (or from any intervening level of cache between the current cache and memory). In particular, one of the cache lines will be identified for eviction. If the data value in that cache line is valid and dirty, then the cache line's data will be written back to memory prior to the new data the subject of the linefill request being overwritten in that cache line, along with the appropriate tag value in the corresponding entry in tag RAM 100. When as a result of that linefill request a new line's worth of data values are stored in the cache, then the valid bit in the associated tag entry will be set to indicate that the data is valid, and the dirty bit will be set to indicate that the data is not dirty.

Figure 3:
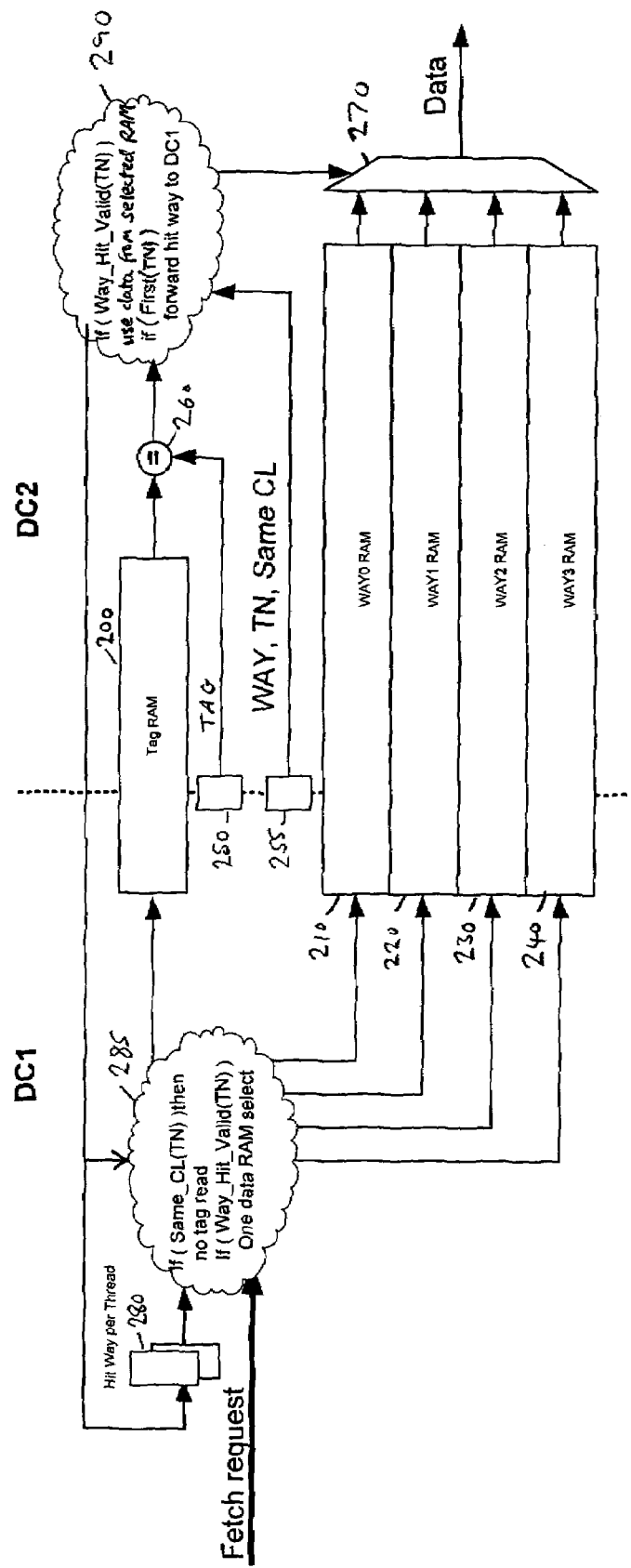
FIG. 3 is a diagram schematically illustrating the operation of a cache in accordance with one embodiment of the present invention.

FIG. 3 is a block diagram of a cache in accordance with one particular embodiment of the present invention, and in particular illustrates an instruction cache where the access request is processed in two stages DC1 and DC2. As shown in FIG. 3, a fetch request is received in stage DC1, and logic shown schematically as element 285 then performs some initial processing based on the fetch request. In particular, the fetch request, in addition to providing an address associated with data value the subject of the fetch request, will include certain other control information, for example a byte mask, and one or more control values identifying whether the fetch request pertains to the same cache line as the previous fetch request, whether the fetch request is the first access to a particular cache line, etc. In addition, in accordance with one embodiment of the present invention, the fetch request includes a source identifier identifying the source of the fetch request. In one embodiment, the processor core 20, 25 accessing the instruction cache 30, 35 is arranged to execute multiple execution threads, and each execution thread is a separate source of access requests to the instruction cache. Hence, in such embodiments, the fetch request includes a thread number identifier identifying the thread that is issuing the fetch request.

As illustrated in FIG. 3, the logic 285 receives not only the fetch request, but also information from a hit way per thread storage element 280, which may for example be formed of one or more registers. The hit way per thread storage element identifies for each thread whether the last access request from that thread resulted in a cache hit, the information in the storage element 280 being updated by the logic 290 provided at the stage DC2.

Figure 4:
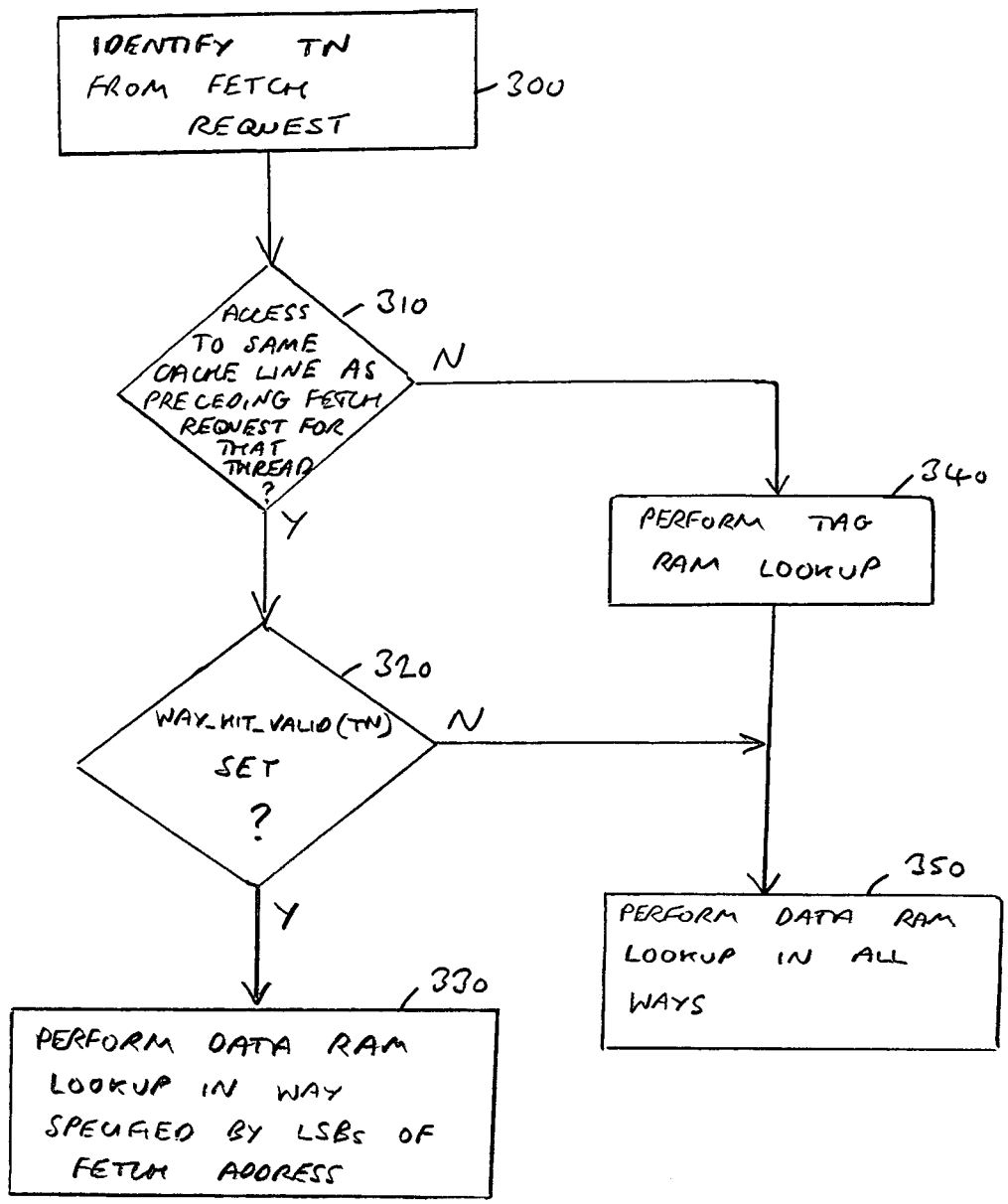
FIGS. 4 to 6 are flow diagrams further illustrating the operation of the cache illustrated in FIG. 3.

The operation of the logic 285 will now be discussed with reference to FIG. 4. Firstly, at step 300, the thread number is identified from the fetch request, whereafter at step 310 it is determined whether the access the subject of the fetch request is to the same cache line as the preceding fetch request for that thread. In this embodiment, this is indicated by a control value included in the fetch request, and determined by cache line identification logic associated with the source of the fetch request. If the fetch request is not to the same cache line, then the process branches to step 340, where the tag RAM 200 is caused to perform a tag RAM lookup. As discussed earlier with reference to FIG. 2, this involves the index portion of the address being used to identify a particular entry in the tag RAM, and for the tag value output from that entry to be compared by the comparator 260 with the tag portion of the address (which is latched in the register 250 at the end of stage DC1). As shown in FIG. 3, this comparison takes place during stage DC2.

Following step 340, the process proceeds to step 350, where a data RAM lookup is performed in all of the ways 210, 220, 230, 240 of the cache. As shown in FIG. 3, this data RAM lookup takes place in parallel with the tag RAM lookup, although typically the output from the tag RAM lookup is available earlier than the output from the data RAM lookup as shown schematically in FIG. 3.

If at step 310 it is determined by the logic 285 that the access is to the same cache line as the preceding fetch request for that thread, then at step 320 it is determined whether the Way_Hit_Valid(TN) value stored in the storage element 280 for the thread in question is set, i.e. whether the preceding access request from that thread resulted in a cache hit. If the preceding access request is still in the DC2 stage (i.e. the current and preceding access requests are back-to-back), then the logic 285 may take this information directly from the output of logic 290 since at that time any update to the register 280 will not have taken place.

If the preceding access request from that thread did not result in a cache hit, then again the data RAM lookup is performed in all of the ways 210, 220, 230, 240 of the cache at step 350. However, if the Way_Hit_Valid(TN) value is set, then the control logic 280 causes a data RAM lookup to be performed only in the way specified by the relevant least significant bits of the fetch address, i.e. those bits identifying the way in which the data value is stored.

It should be noted that when determining at step 310 whether an access is to the same cache line as the preceding fetch request for that thread, the access does not necessarily need to be strictly sequential. In particular, a sequential access would be an access to the same cache line, and with an address which is merely incremented with respect to the address of the preceding fetch request. However, it will be appreciated that provided the access is to a data value within the same cache line, the energy saving techniques of embodiments of the present invention can still be utilised, even if the data value being accessed is not at the immediately incremented address with respect to the data value accessed by the preceding access request. Hence, as an example, and considering the cache line shown in FIG. 2, an access to the data value in way 0 in a particular cache line could be followed by an access to the data value in way 2 of that same cache line, and it would still be concluded at step 310 in FIG. 4 that that second access was to the same cache line as the preceding fetch request, and accordingly the process would proceed to step 320.

The branch from step 320 to step 350 is typically only used because of the delay in updating the Way_Hit_Valid(TN) information following a cache hit, since as is clear from FIG. 3 such an update takes two cycles. It is clear that when following this path, there will either be a hit in the cache, and the relevant way will be known from the address information, in particular the way part of the address which is latched in the register 255 at the end of stage DC1, or alternatively there will be a cache miss. In either event, there is no need to perform the tag lookup, since this has already been performed for the preceding access request to the same cache line.

Figure 5:
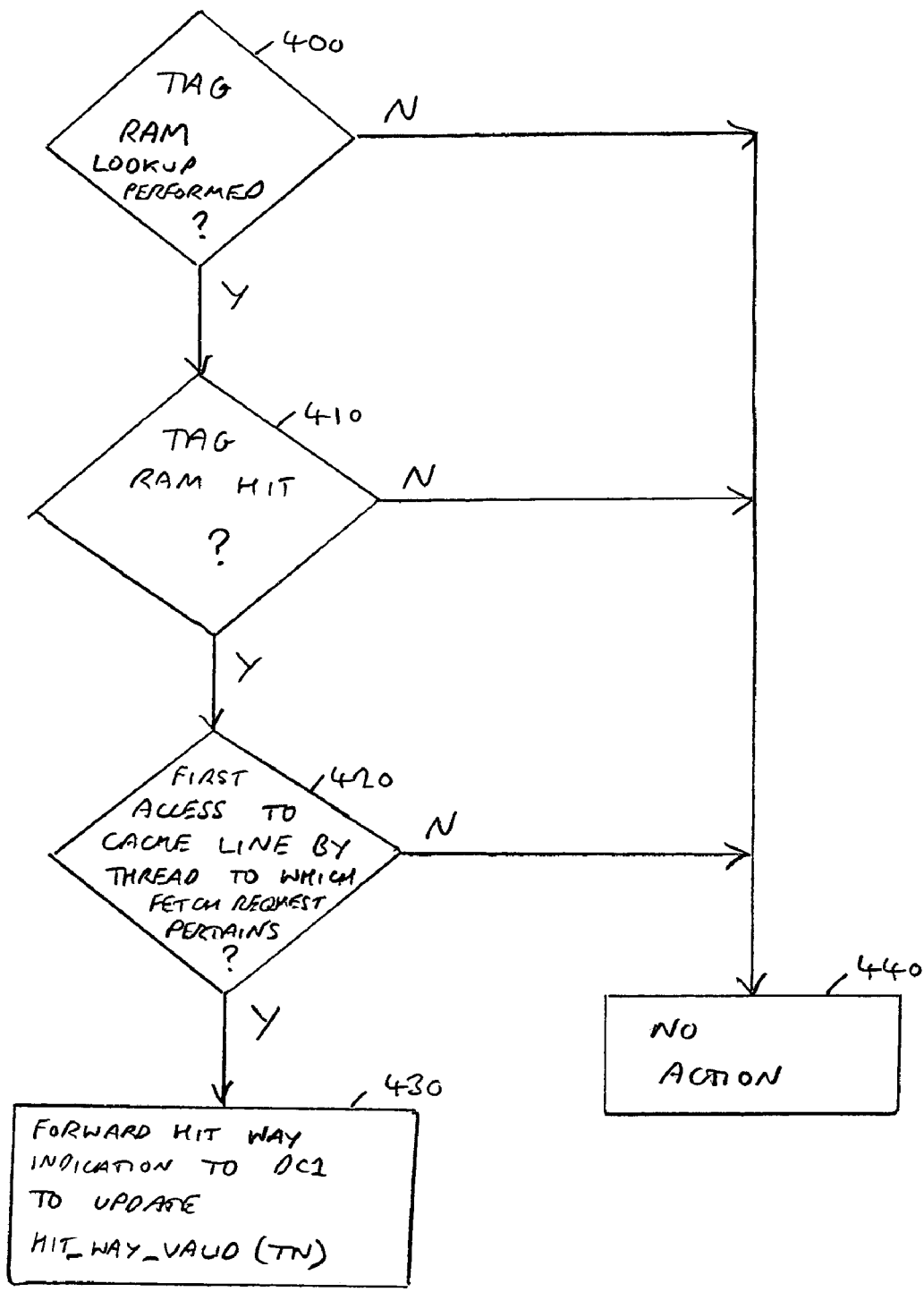

As shown in FIG. 3, the multiplexer 270 used to select which data is output from the cache is controlled by the logic schematically illustrated by element 290 which is arranged to receive the output from the comparator 260 and also certain control information latched in the register 255. In particular, this logic 290 receives the way portion of the address, the thread number identifier, and the indication as to whether the fetch request pertains to the same cache line as the preceding fetch request for the same thread, which as mentioned earlier is also provided as a control value within the fetch request in this embodiment. Two separate processes are performed by the logic 290 of FIG. 3, the first process being to decide whether any update to the contents of the storage element 280 are required (which will be discussed further with reference to FIG. 5) and the second process deciding which of the inputs to the multiplexer 270 should be output if any (which will be discussed further with reference to FIG. 6). Discussing first FIG. 5, it is determined at step 400 whether a tag RAM lookup was performed by the tag RAM 200. If not, no update will be necessary to the contents of the storage element 280, and accordingly the process proceeds to step 440 where no action is taken. However, if it is determined at step 400 that a tag RAM lookup has been performed, then it is determined at step 410 whether that tag RAM lookup resulted in a hit. If not, then again no action is required. However, if a tag RAM hit did occur, it is then determined at step 420 whether the access in question is the first access to the cache line by the thread to which the fetch request pertains. This can be deduced from the same cache line information in the register 255, or alternatively a separate piece of control information can be included in the fetch request specifically identifying whether the fetch request is the first access to a particular cache line. If it is not the first access to the cache line by the thread to which the fetch request pertains, then no action is required. However, if it is the first access to the cache line by the thread to which the fetch request pertains, then the process proceeds to step 430, where the hit way indication is forwarded from the logic 290 to stage DC1 in order to cause an update to the Hit_Way_Valid signal for the appropriate thread in the storage element 280. As mentioned earlier, there is a two cycle delay in this update due to the two stages DC1 and DC2 required to process each fetch request.

Figure 6:
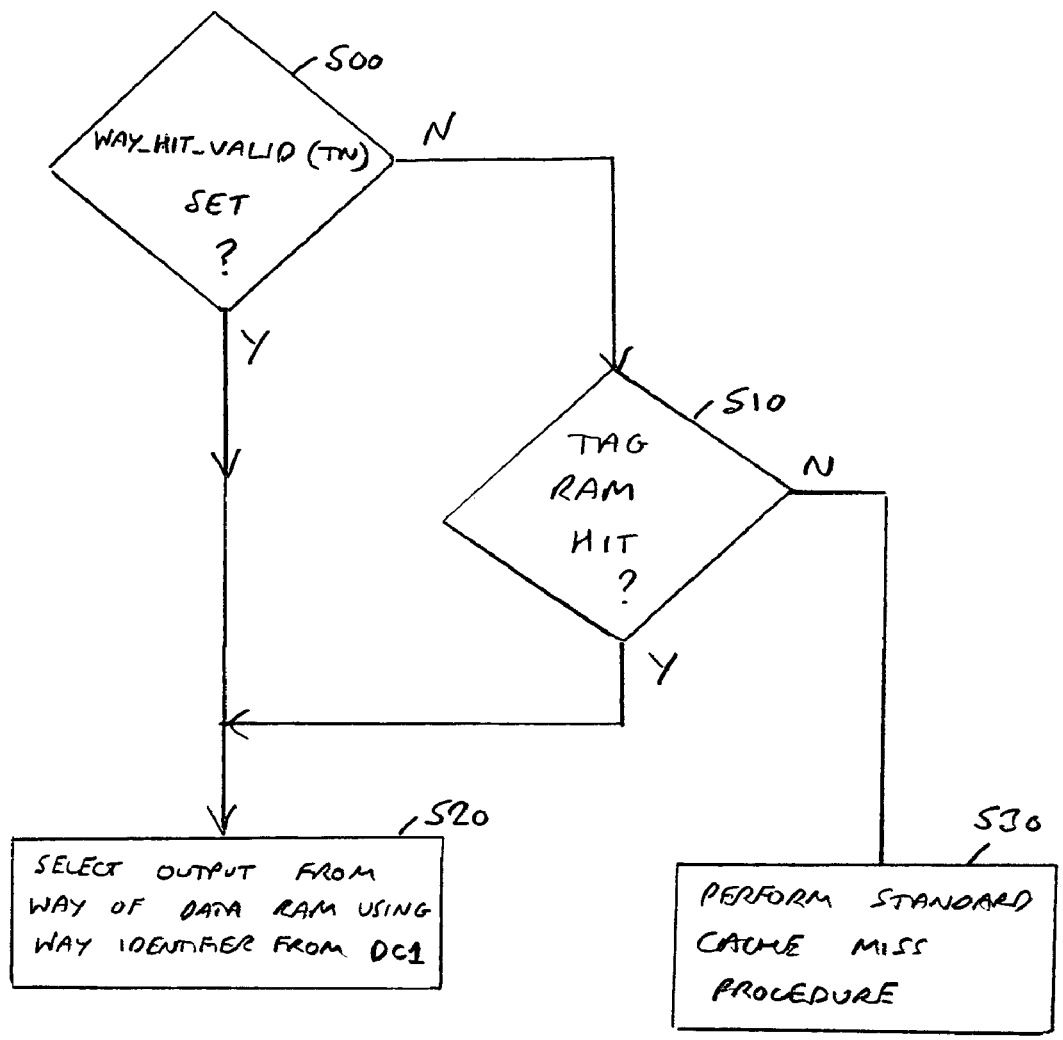

Considering FIG. 6, the logic 290 determines at step 500 whether the Way_Hit_Valid value for the relevant thread is set, this information being deduced by the logic 290 from the contents of the register 255. If it is, then the logic 290 causes the multiplexer 270 to select as its output the input from the way of the data RAM selected by logic 285 at step 330 of FIG. 4 (this information being identified by the way information forwarded from the stage DC1 (i.e. the way information stored in the register 255). As shown in FIG. 6, the same step 520 is performed if the Way_Hit_Valid value for the appropriate thread is not set but nevertheless a tag RAM hit is detected at step 510. If a tag RAM hit is not detected at step 510, then the standard cache miss procedure is performed at step 530, such a cache miss procedure having been discussed earlier.

Figure 7:
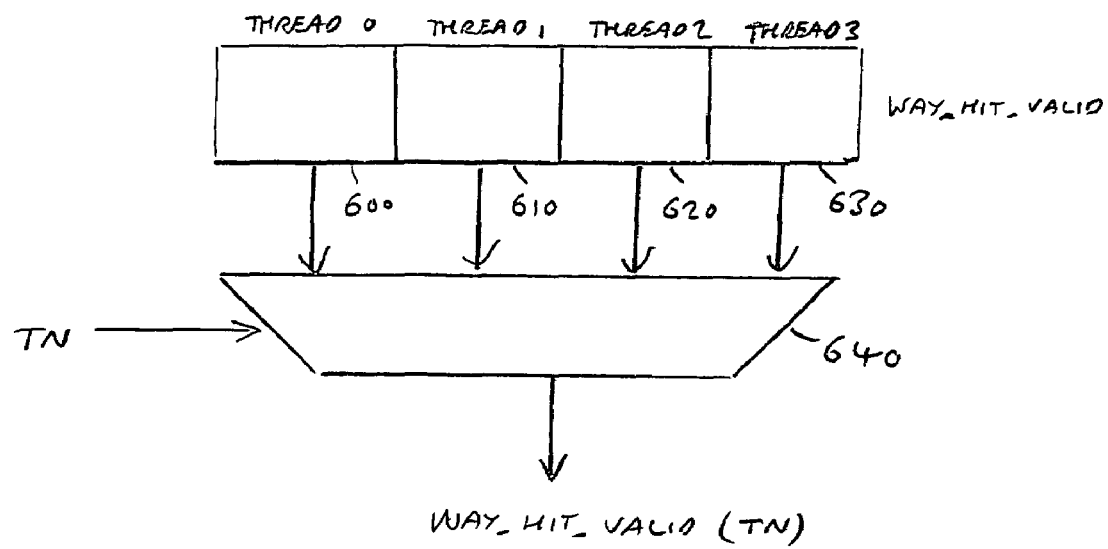
FIG. 7 is a diagram schematically illustrating the hit way per thread storage element illustrated in FIG. 3 in accordance with one embodiment of the present invention.

FIG. 7 is a diagram schematically illustrating the storage element 280 of FIG. 3. As can be seen from FIG. 7, this storage element 280 consists of a Way_Hit_Valid register having fields 600, 610, 620, 630, i.e. one field for each thread. In one particular embodiment, these fields are single bit fields which have a first value to indicate that a miss occurred for the last access request issued by the particular thread, and have a different value to indicate that a hit occurred for the last access request issued by the particular thread. The contents of the way hit valid register are output to a multiplexer 640, which dependent on the thread number identified within the fetch request then outputs a Way_Hit_Valid signal associated with that thread.

The multi-thread aware instruction cache of the embodiment described above with reference to FIGS. 3 to 7 can provide significant energy saving benefits and in particular these benefits can be significantly larger than would be possible with a single thread implementation assuming a pipelined instruction cache implementation as shown in FIG. 3 where each access takes several cycles. In particular, as described earlier with reference to FIG. 3, if the instruction cache RAM access requires two stages, namely stages DC1 and DC2, the tag information cannot be re-used immediately but instead can only be re-used one cycle later. As a result, if a single thread is fetching sequentially from the start of a cache line, the RAM enable pattern would be as disclosed in Table 1 below:

TABLE 1

| | Thread | | | |
|---|---|---|---|---|
| | T0 | T0 | T0 | T0 |
| Address [4:3] | 0 | 1 | 2 | 3 |
| Tag RAM | x | | | |
| W0 RAM | x | x | | |
| W1 RAM | x | x | | |
| W2 RAM | x | x | x | |
| W3 RAM | x | x | | x |

In Table 1, the term "WN" refers to the data RAM for way number N, and an "x" indicates that the corresponding RAM is enabled. Accordingly, it can be seen from Table 1 that for a single thread sequential access to four sequential addresses starting at way 0, this requires one tag RAM access and ten data RAM accesses in order to process the four instruction fetches.

However, according to the techniques of embodiments of the present invention where the instruction cache is thread aware, then two interleaved threads fetching sequentially each from the start of a cache line will result in the RAM enable pattern illustrated in Table 2 below:

TABLE 2

| | Thread | | | | | | | |
|---|---|---|---|---|---|---|---|---|
| | T0 | T1 | T0 | T1 | T0 | T1 | T0 | T1 |
| Address [4:3] | 0 | 0 | 1 | 1 | 2 | 2 | 3 | 3 |
| Tag RAM | X | x | | | | | | |
| W0 RAM | X | x | | | | | | |
| W1 RAM | X | x | x | x | | | | |
| W2 RAM | X | x | | | x | x | | |
| W3 RAM | X | x | | | | | x | x |

As can be seen from Table 2, since the second access for thread 0 is separated from the first access by an access request issued by thread 1, the results of the tag RAM lookup are available in time for the second thread 0 lookup and accordingly only a single data RAM lookup needs to be performed. This also works in the same manner for the second lookup of thread 1. Accordingly, as a result these accesses require two tag RAM accesses and fourteen data RAM accesses, i.e. one tag RAM access and seven data RAM accesses per thread. Accordingly, this approach saves three data RAM accesses per cache line when compared with the single thread situation discussed earlier with reference to Table 1.

It will be noted from Table 1 and Table 2 that bits 4 and 3 of the address are indicated as providing the way information. In this particular example, each cache line contains 64 bits of data, and hence 64 bits of data are accessed at a time. In one embodiment these 64 bits of data may represent 2 ARM instructions or up to four Thumb-2 instructions (ARM and Thumb instructions being instructions defined by instruction sets developed by ARM Limited, Cambridge, United Kingdom), and accordingly bits 2, 1 and 0 of the address are not used.

Accordingly, the above examples show that two threads can use the instruction cache more efficiently than one. In particular, the one cycle gap between the first and second access of the same thread (this gap being used by another thread) allows the cache controller to forward way hit information from stage DC2 to DC1 and exclude three unwanted data RAMs from being read for the second access. From benchmarking tests, it has been found that compared to a single thread implementation, an additional 5% of instruction fetches can be serviced by only one data RAM read instead of four data RAM reads, when using embodiments where the instruction cache is thread aware and hence can detect accesses to the same cache line by particular threads. In particular, in one set of tests, it was determined that for an instruction cache that was not thread aware, approximately 5.7% of instruction fetches can be serviced by reading one data RAM instead of all four, whereas when employing a thread-aware technique such as described with reference to FIG. 3, approximately 11.4% of instruction fetches can be serviced by one data RAM access instead of four.

Whilst the embodiment of FIG. 3 relates to an instruction cache, it will be appreciated that similar techniques can also be applied in respect of the data caches 40, 45 shown in FIG. 1, and indeed in respect of unified caches such as the level two cache 70 shown in FIG. 1. When considering accesses to unified caches, then even considering a single thread, there will be two sources of accesses to the level two cache, namely instruction fetch requests and data access requests. By associating a different source identifier with these two types of accesses, then the cache controller in the unified cache can detect a sequence of instruction accesses to the same cache line or a sequence of data accesses to the same cache line and employ the above described energy saving techniques accordingly. Considering a level two cache, or indeed any level of cache that is shared between multiple processing units, then different source identifiers can be associated with the different processing units, and indeed with any multiple sources within a particular processing unit, for example different threads, instruction accesses, data accesses, etc, and again by distinguishing between these various sources a sequence of accesses to the same cache line from the same source can be detected to allow the above described energy saving techniques to be implemented.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
at least one processing unit for performing operations;
a cache having a plurality of cache lines for storing data values for access by the at least one processing unit when performing said operations;
the at least one processing unit providing a plurality of sources from which access requests are issued to the cache, each access request specifying an address of a data value the subject of that access request, and each access request further including a source identifier indicating which of said plurality of sources issued that access request;
cache control logic, responsive to each access request, to cause a lookup procedure to be performed in said cache, a hit condition occurring if the lookup procedure identifies that the data value the subject of the access request is in the cache;
a storage element configured to store, for each source, an indication as to whether a last access request from that source resulted in said hit condition;
cache line identification logic configured, for each access request, to determine whether that access request is seeking to access a same cache line as the last access request issued by that source;

said cache comprising a plurality of storage blocks in which said lookup procedure can be performed, the cache comprising a plurality of cache ways, said plurality of storage blocks comprising a plurality of way blocks for storing data values, each way block being associated with one of said cache ways;

said cache control logic configured, for each access request, to identify from the source identifier the source of the access request;

said cache control logic also configured, if the cache line identification logic determines that the access request is to the same cache line as the last access request issued by that source, and the storage element indicates that the last access request from that source resulted in said hit condition, to constrain said lookup procedure to only a subset of said way blocks.

2. A data processing apparatus as claimed in claim 1, wherein each cache line stores one or more data values for each cache way.

3. A data processing apparatus as claimed in claim 1, wherein:
the address specified by each access request identifies one of said cache ways; and
for each access request, if the cache line identification logic determines that that access request is to the same cache line as the last access request issued by the identified source, and the storage element indicates that the last access request from that source resulted in said hit condition, the cache control logic is operable to prevent the lookup procedure being performed in any way block not associated with the cache way identified by the address.

4. A data processing apparatus as claimed in claim 3, wherein if the storage element indicates that the last access request from that source resulted in said hit condition, the cache is operable to select as its output from the plurality of way blocks an output from the way block associated with the cache way identified by the address.

5. A data processing apparatus as claimed in claim 1, wherein:
said plurality of storage blocks further comprises a tag block for storing tag values, each tag value being associated with one of said cache lines, the address specified by each access request having a tag portion, and a match between that tag portion and a selected tag value in the tag block indicating said hit condition;
for each access request, if the cache line identification logic determines that that access request is to a same cache line as the last access request issued by the identified source, the cache control logic is operable to prevent the lookup procedure being performed in the tag block.

6. A data processing apparatus as claimed in claim 5, wherein if for an access request the cache control logic causes the lookup procedure to be performed in the tag block, and said hit condition is detected, the indication provided in the storage element for the source issuing that access request is updated to identify said hit condition.

7. A data processing apparatus as claimed in claim 6, wherein the indication provided in the storage element for the source issuing that access request is only updated to identify said hit condition if additionally the last access request from that source was to a different cache line to the cache line for which the hit condition has been detected.

8. A data processing apparatus as claimed in claim 1, wherein the cache line identification logic is associated with each source, and each access request further includes a control value identifying if that access request is to the same cache line as the last access request issued by the source indicated by the source identifier.

9. A data processing apparatus as claimed in claim 1, wherein the cache line identification logic is associated with the cache control logic and is operable to retain at least a portion of the address of the last access request from each source, on receipt of an access request the cache line identification logic being operable to compare the corresponding at least a portion of the address specified by that access request with the retained at least a portion of the address of the last access request from that source in order to determine whether the access request is seeking to access the same cache line.

10. A data processing apparatus as claimed in claim 1, wherein the cache line identification logic comprises prediction logic operable for each access request to predict whether that access request is seeking to access the same cache line as the last access request issued by that source.

11. A data processing apparatus as claimed in claim 1, wherein the at least one processing unit is a processing unit having a plurality of execution threads, each execution thread forming one of said sources, and the cache is an instruction cache for storing instructions for access by the plurality of execution threads.

12. A data processing apparatus as claimed in claim 1, wherein the at least one processing unit is a processing unit having at least one execution thread, and the cache is a unified cache for storing instructions and data, the at least one execution thread providing a first source for instruction access requests and a second source for data access requests.

13. A data processing apparatus as claimed in claim 1, wherein the at least one processing unit comprises a plurality of processing units, each processing unit providing at least one of said sources, and the cache is a system level cache accessible by each of said processing units.

14. A data processing apparatus as claimed in claim 13, wherein said cache is a unified cache storing both instructions and data, at least one of said processing units providing a first source for instruction access requests and a second source for data access requests.

15. A cache for use in a data processing apparatus having at least one processing unit for performing operations, the at least one processing unit providing a plurality of sources from which access requests are issued to the cache, each access request specifying an address of a data value the subject of that access request, and each access request further including a source identifier indicating which of said plurality of sources issued that access request, the cache comprising:

a plurality of cache lines for storing data values for access by the at least one processing unit when performing said operations;

cache control logic, responsive to each access request, to cause a lookup procedure to be performed in said cache, a hit condition occurring if the lookup procedure identifies that the data value the subject of the access request is in the cache;

a storage element configured to store, for each source, an indication as to whether a last access request from that source resulted in said hit condition; and a plurality of storage blocks in which said lookup procedure can be performed, said plurality of cache lines being provided within said plurality of storage blocks, the cache comprising a plurality of cache ways, said plurality of storage blocks comprising a plurality of way blocks for storing data values, each way block being associated with one of said cache ways;

the data processing apparatus further comprising cache line identification logic operable, for each access request, to determine whether that access request is seeking to access a same cache line as the last access request issued by that source;

said cache control logic configured, for each access request, to identify from the source identifier the source of the access request;

said cache control logic also configured, if the cache line identification logic determines that the access request is to the same cache line as the last access request issued by that source, and the storage element indicates that the last access request from that source resulted in said hit condition, to constrain said lookup procedure to only a subset of said way blocks.

16. A method of operating a data processing apparatus comprising at least one processing unit for performing operations, and a cache having a plurality of cache lines for storing data values for access by the at least one processing unit when performing said operations, the at least one processing unit providing a plurality of sources from which access requests are issued to the cache, and the method comprising the steps of:

within each access request, specifying an address of a data value the subject of that access request, and a source identifier indicating which of said plurality of sources issued that access request;

responsive to each access request, causing a lookup procedure to be performed in said cache, said cache comprising a plurality of storage blocks in which said lookup procedure can be performed, the cache comprising a plurality of cache ways, said plurality of storage blocks comprising a plurality of way blocks for storing data values, each way block being associated with one of said cache ways and a hit condition occurring if the lookup procedure identifies that the data value the subject of the access request is in the cache;

storing, for each source, an indication as to whether a last access request from that source resulted in said hit condition; and for each access request:

determining whether that access request is seeking to access a same cache line as the last access request issued by that source;

identifying from the source identifier the source of the access request; and if that access request is to the same cache line as the last access request issued by that source, and the last access request from that source resulted in said hit condition, constraining said lookup procedure to only a subset of said way blocks.

17. A data processing apparatus comprising:

at least one processing unit for performing operations;

a cache having a plurality of cache lines for storing data values for access by the at least one processing unit when performing said operations;

the at least one processing unit providing a plurality of sources from which access requests are issued to the cache, each access request specifying an address of a data value the subject of that access request, and each access request further including a source identifier indicating which of said plurality of sources issued that access request;

cache control logic responsive to each access request to cause a lookup procedure to be performed in said cache, a hit condition occurring if the lookup procedure identifies that the data value the subject of the access request is in the cache;

a storage element for storing, for each source, an indication as to whether a last access request from that source resulted in said hit condition;

cache line identification logic operable, for each access request, to determine whether that access request is seeking to access a same cache line as the last access request issued by that source;

said cache comprising a plurality of storage blocks in which said lookup procedure can be performed, the cache comprising a plurality of cache ways, said plurality of storage blocks comprising a plurality of way blocks for storing data values, each way block being associated with one of said cache ways;

said cache control logic being operable, for each access request, to identify from the source identifier the source of the access request;

said cache control logic being further operable, if the cache line identification logic determines that the access request is to the same cache line as the last access request issued by that source, and the storage element indicates that the last access request from that source resulted in said hit condition, to constrain said lookup procedure to only a subset of said storage blocks, wherein said plurality of storage blocks further comprises a tag block for storing tag values, each tag value being associated with one of said cache lines, the address specified by each access request having a tag portion, and a match between that tag portion and a selected tag value in the tag block indicating said hit condition;

for each access request, if the cache line identification logic determines that that access request is to a same cache line as the last access request issued by the identified source, the cache control logic is operable to prevent the lookup procedure being performed in the tag block;

wherein if for an access request the cache control logic causes the lookup procedure to be performed in the tag block, and said hit condition is detected, the indication provided in the storage element for the source issuing that access request is updated to identify said hit condition, wherein the indication provided in the storage element for the source issuing that access request is only updated to identify said hit condition if additionally the last access request from that source was to a different cache line to the cache line for which the hit condition has been detected.

* * * * *